J. P. WILL.
SUSPENSION DEVICE FOR AUTOMOBILES.
APPLICATION FILED JAN. 9, 1911.

1,040,079.

Patented Oct. 1, 1912.
2 SHEETS—SHEET 1.

WITNESSES

INVENTOR
Joseph Peter Will
BY
ATTORNEYS

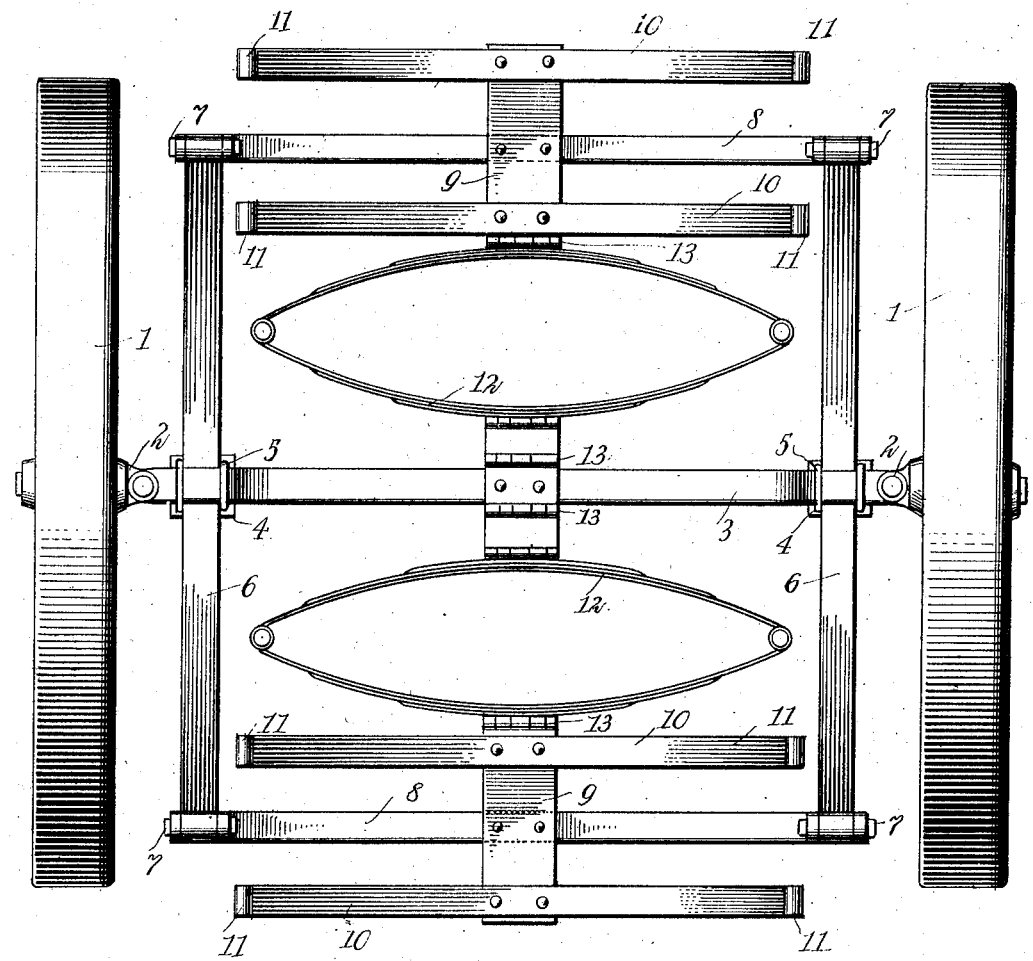

UNITED STATES PATENT OFFICE.

JOSEPH PETER WILL, OF JERSEY CITY, NEW JERSEY.

SUSPENSION DEVICE FOR AUTOMOBILES.

1,040,079.  Specification of Letters Patent.  Patented Oct. 1, 1912.

Application filed January 9, 1911. Serial No. 601,632.

*To all whom it may concern:*

Be it known that I, JOSEPH PETER WILL, a citizen of the United States, and a resident of Jersey City, in the county of Hudson and State of New Jersey, have invented a new and Improved Suspension Device for Automobiles, of which the following is a full, clear, and exact description.

My invention consists of a suspension frame for automobiles and vehicles in general, and its object is to deaden the jolting and jarring which is always encountered in passing over rough roads. To this end my suspension frame is so designed that the body of the vehicle is supported on axles with its center of gravity in the lowest position; and it includes an arrangement of vertically and horizontally yieldable springs, by means of which the vibrations of the vehicle in motion are reduced to a minimum, thus permitting the occupants of the vehicle to travel with the greatest possible degree of comfort even when rubber tires are not used.

Reference is to be had to the accompanying drawings forming a part of this specification, in which similar characters of reference indicate corresponding parts in all the views.

Figure 1:
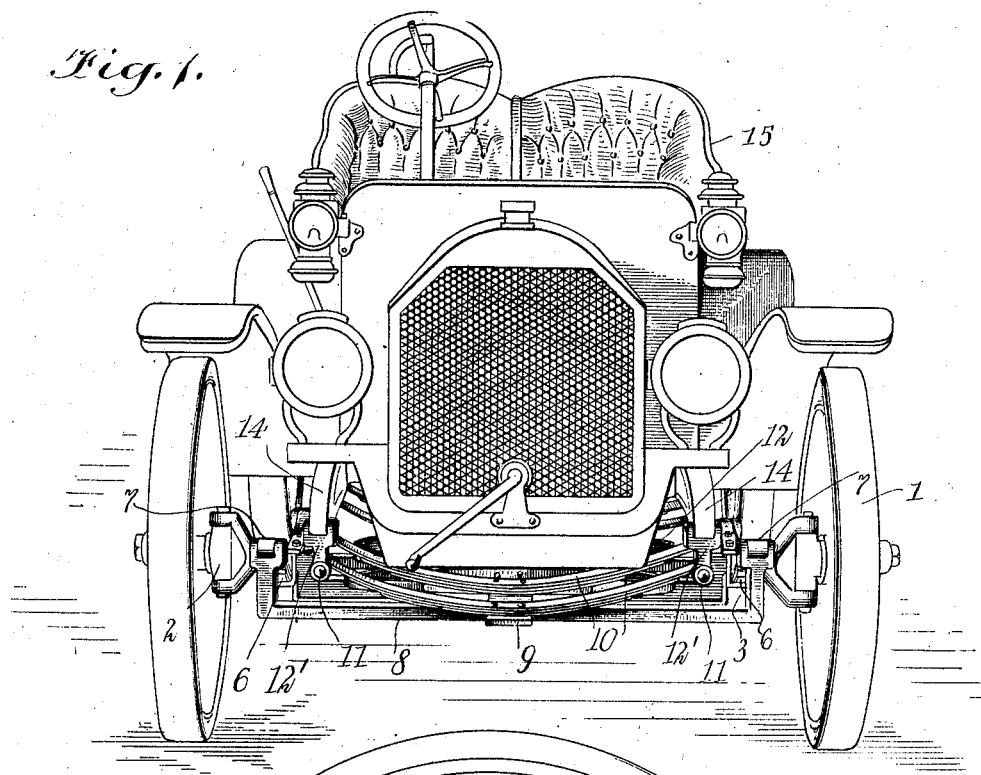
Figure 2:
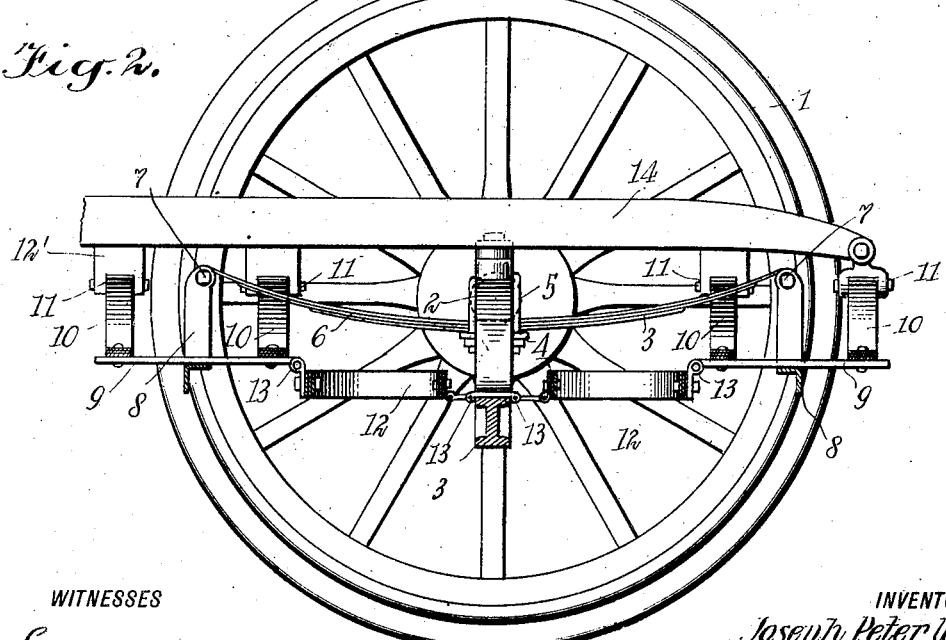

Figure 1 is a front view of an automobile, showing my suspension frame in place between the vehicle body and the front axle thereof; Fig. 2 is a vertical sectional view through my suspension frame, showing the wheel attached thereto and a portion of the body or chassis of the vehicle; and Fig. 3 is a top plan of my suspension device.

On the drawings, a pair of wheels on which the vehicle body is supported, for example the front wheels, is indicated at 1. These wheels are connected by means of trunnions 2 to a dropped body axle 3. This axle 3, as shown on Fig. 2, may be I-shaped in cross-section in order to save material and at the same time obtain the greatest degree of strength and stiffness. Supported by this axle 3 at either end thereof and beyond the dropped body portion are clamping plates 4 and U-shaped clamping members 5, by means of which leaf springs 6 of the type usually known as "carriage springs" are held in place. These springs are normally held parallel with the longitudinal axis of the vehicle, and are turned upward at the ends so that they can be made to yield vertically downward when the weight of the vehicle body is supported thereon.

Supported from the ends of the carriage springs 6 are two transverse dropped body hangers 8, which are connected to the ends of the springs 6 by means of pivot-bolts 7. These dropped body hangers are similar in general shape to the dropped body axle 3, but are preferably made L-shape in cross-section, as shown. These dropped body hangers 8 do not hang as low as the dropped body axle 3, but along with the dropped body axle 3 they are arranged to hang as low as possible, thus leaving only sufficient space between the body of the vehicle and the ground to give road clearance when the vehicle is in motion.

Numerals 9 indicate two rigid plates which are fastened to the dropped body hangers 8 at their centers, and are of sufficient size to extend some distance on either side of these hangers. The outer ends of these plates 9 support carriage springs 10, the ends 11 of which are designed to be connected to the side of the vehicle body and support the same. Similar carriage springs are supported by the plates 9 at their opposite ends on the other side of the dropped body hangers. These springs also are connected directly to the body of the vehicle, members 12′ of suitable size and shape being attached to the bottom of the vehicle to afford a connection for the ends 11 of the springs 10. Elliptical springs 12 are also carried by my improved suspension frame in such a position as to be inclosed thereby, each being located between the axle 3 and one of the dropped body hangers 8, and each being connected on one side by means of hinges 13 to one of the plates 9, and on its opposite side by similar hinges 13, to the dropped body axle 3.

Numerals 14 indicate longitudinal supports to which the suspension frame is connected, said supports bearing the weight of the body of the vehicle, which is shown at 15.

The vehicle I have shown is an automobile provided with steering wheels, lamps and other accessories, but the wheels 1 thereof need not be provided with rubber tires, since my improved suspension frame deadens the jarring and jolting and in a large measure eliminates the difficulties which ordinarily rubber tires do not overcome. It will be understood that I use my improved suspension frame as above described not only in connection with the front wheels of the vehicle but in connection with the rear wheels also. By means of the special arrangement of springs between the axle and the vehicle body, any jarring or jolting is deadened before the force thereof can be transmitted to the body of the vehicle, and the unpleasant effects caused by the vehicle passing over obstructions in its path are thus avoided. Any vibrations that may be caused when the vehicle is in motion have too far to travel from the axle through my improved suspension frame to the body of the vehicle to permit the occupants thereof to be disturbed.

The springs 6 being vertically yieldable, prevent the vehicle from bouncing to an undue extent. Should one of the wheels strike a stone the body 15, being centrally suspended, will allow the wheel to rise and pass over the stone; and the body will give slightly forward owing to the horizontal position of the springs 12. As a result no vibrations will be felt in the frame or body 15. The springs 12 then rebound and return the body 15 to its proper position.

While I have shown my improved suspension frame as applied to an automobile, it is obvious that I may use it on any kind of vehicle, and by means of the special arrangement of the springs shown and described, the vertical bouncing which is always experienced on rough roads, as well as the horizontal jolts and jars to which the vehicle is subjected, are largely obviated. Hence, I do not have to use pneumatic or other rubber tires, but I may employ solid tires of any suitable material, such as leather, in their stead.

Having thus described my invention, I claim as new and desire to secure by Letters Patent:

1. In a suspension device for vehicles, the combination of a dropped body axle, vertically yieldable spring means at each end of said axle and supported thereby, dropped body hangers supported by said spring means on either side of said axle, spring connections supported by said dropped body hangers and adapted to be connected to the body of the vehicle to be supported, and horizontally yieldable spring means connected to the said hangers on one side and to the dropped body axle on the other to coöperate with the first-mentioned spring means.

2. A suspension device for vehicles, comprising a dropped body axle, vertically yieldable leaf spring means supported by said axle at either end thereof and transversely arranged with respect thereto, dropped body hangers carried by the ends of said spring means on either side of said axle, plates supported by said dropped body hangers at their centers, transverse suspension spring means carried by said plates to be connected at their ends to the body of the vehicle to be supported, and horizontally yieldable elliptical spring means hinged on one side to the said plates and on the other side to the axles to coöperate with the first-mentioned spring means.

3. A suspension device for vehicles, comprising a dropped body axle, leaf spring means supported by said axle at either end thereof and transversely arranged with respect thereto, dropped body hangers supported by said leaf spring means, suspension spring means carried by said dropped body hangers to be attached to the body of the vehicle to be supported, and horizontally yieldable elliptical spring means connected on one side to the said dropped body hangers and on the other side to said axle to coöperate with the first-mentioned spring means, and to permit the body to give slightly when encountering an obstruction.

4. In a suspension device for vehicles, the combination of an axle, vertically yieldable spring means supported at each end of said axle, transverse hangers pivotally connected to the ends of said spring means, vertically yieldable spring means carried by said hangers and designed to be connected at their ends to the body of the vehicle to support the weight of the same, and means connecting said hangers to said axle to diminish the oscillation of said hangers around the ends of said vertically yieldable spring means at the ends of the axle as an axis.

5. In a suspension device for vehicles, the combination of an axle, vertically yieldable spring means supported at each end of said axle, vertically yieldable spring means transversely arranged with respect to said first-named spring means, means for supporting the transverse springs from the first-named spring means, said second-named spring means being adapted to be connected to the body of the vehicle to support the same, and horizontally yieldable spring means connected to the said axle on one side and to said second-named vertically yieldable spring means on the other side.

6. In a suspension device for vehicles, the combination of an axle, vertically yieldable spring means at each end of said axle and supported thereby, transverse hangers pivotally mounted at their opposite ends in the ends of said spring means, transverse vertically yieldable spring means supported centrally by said hangers, said spring means being connected to the body of the vehicle at their outer ends to support the same, and means for connecting the transverse spring means to the axle between the first spring means.

7. In a suspension device for vehicles, the combination of an axle, vertically-yieldable spring means at each end of said axle and supported thereby, a hanger supported by said spring means, spring means connected to said hanger and to the body of the vehicle to support the same, and horizontally-yieldable spring means connected to said hanger and to said axle to coöperate with the first-named spring means.

8. In a suspension device for vehicles, the combination of an axle, vertically-yieldable spring means at each end of said axle and supported thereby, a hanger supported by said spring means, spring connections between said hanger and the body of the vehicle to support the same, and horizontally-yieldable spring means pivotally connected to said hanger on one side and to the axle on the other, to coöperate with the first-named spring means.

9. In a suspension device for vehicles, the combination of an axle, vertically yieldable spring means on each end of said axle and supported thereby, vertically yieldable spring means connected to the body of the vehicle, means connecting said second-named spring means to be supported by the first-named spring means, and resilient means for independently connecting the second-named spring means to the axle of the vehicle to diminish the oscillation of said second-named spring means with respect to said axle.

In testimony whereof I have signed my name to this specification in the presence of two subscribing witnesses.

JOSEPH PETER WILL.

Witnesses:
PHILIP M. HULL,
ALBERT E. TERHUNE.

Copies of this patent may be obtained for five cents each, by addressing the "Commissioner of Patents, Washington, D. C."